Oct. 10, 1950     A. C. SCHLEH     2,524,930
LAWN SPRINKLER
Filed March 18, 1948
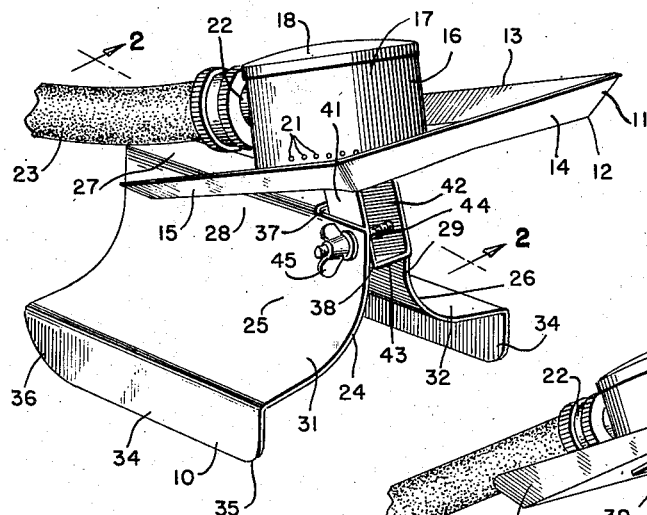
FIG. 1
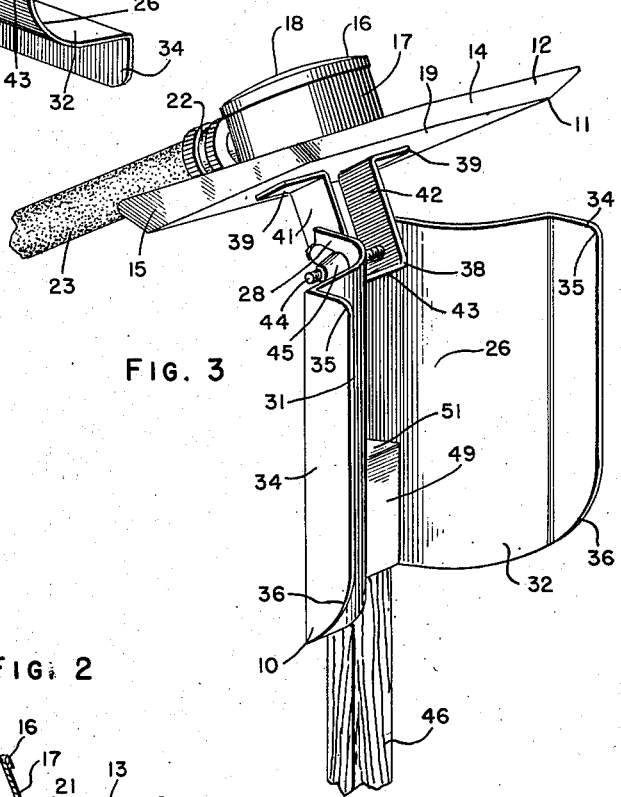
FIG. 3
FIG. 2
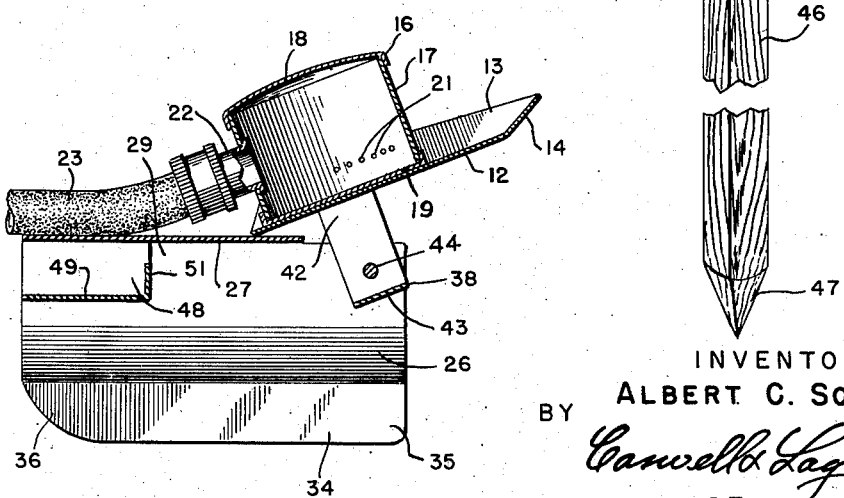
INVENTOR
ALBERT C. SCHLEH
BY
*Canwell & Lagaard*
ATTORNEYS Patented Oct. 10, 1950

2,524,930

UNITED STATES PATENT OFFICE 2,524,930

LAWN SPRINKLER

Albert C. Schleh, St. Paul, Minn.

Application March 18, 1948, Serial No. 15,711

6 Claims. (Cl. 248—88)

My invention relates to lawn sprinklers and has for an object to provide a sprinkler which may be easily moved about over the lawn by merely drawing upon the hose attached to the sprinkler.

Another object of the invention resides in providing a sprinkler which may be placed directly upon the ground or which may be disposed in an elevated position.

An object of the invention consists in constructing the sprinkler with a base having a body constructed with sides provided with spaced parallel positions and outwardly extending flaring portions together with runners formed on said flaring portions for supporting the base upon the ground.

A still further object of the invention resides in providing the sprinkler with a spray having a bracket attached thereto and disposed between and clamped to the parallel portions of the sides of the base.

Another object of the invention resides in providing the base with a back disposed between the sides and in constructing the back shorter than the parallel portions of the sides to provide a slot therebetween and in which the bracket carrying the spray is disposed.

Another object of the invention resides in forming between the parallel portions of the sides and the back, a socket for the reception of a post on which the sprinkler may be mounted.

A feature of the invention resides in constructing said socket by providing a plate extending between said parallel portions and secured thereto, and in constructing said plate with a flange, forming an end wall for said socket.

Other objects of the invention reside in the novel combination and arrangement of parts and in the details of construction hereinafter illustrated and/or described.

In the drawings:

Fig. 1 is a perspective view of a lawn sprinkler illustrating an embodiment of my invention and showing the sprinkler supported on the runners thereof.

Fig. 2 is a longitudinal sectional view of the sprinkler illustrated in Fig. 1 and taken on line 2—2 of Fig. 1.

Fig. 3 is a perspective view of the lawn sprinkler illustrating the same mounted upon a post.

My invention comprises a base 10 on which is mounted a spray 11. The spray 11 may be positioned at various angles with respect to the base. The base 10 may be supported in either of two positions so as to permit of utilizing the spray from the ground or from an elevated position.

The various parts of the invention will now be described in detail.

The spray 11 consists of a pan 12 which is formed at three of its edges with upwardly flaring deflectors 13, 14 and 15. Mounted in the center of the pan 12 is a receptacle 16 which forms a spray head. This receptacle has a cylindrical wall 17 and end walls 18 and 19. In the cylindrical wall 17 is formed a number of orifices 21 which are adapted to direct the water discharged from the spray head 16 against the deflectors 13, 14 and 15. A hose connector 22 is attached to the wall 17 at a locality opposite the orifices 21 and by means of which a hose 23 may be connected to the spray head 16.

The base 10 is constructed from sheet metal which is bent intermediate its ends to form a body 24 having sides 25 and 26 and a back 27 disposed therebetween. The sides 25 and 26 have spaced parallel portions 28 and 29 which merge with outwardly extending flaring portions 31 and 32. Formed at the edges of said flaring portions are runners 34 which are curved at their ends as designated at 35 and 36. The flaring portions 31 and 32 of the base 10 provide a suitable spread for the runners 34.

The back 27 of the base 10 falls short of the ends of the parallel portions 28 and 29 so as to form a slot 37 therebetween. Within this slot is mounted a bracket 38 which is U-shaped in form and which is constructed with legs 41 and 42 and a connecting portion 43 therebetween. The ends of the legs 41 and 42 have flanges 39 formed thereon and which are spot welded to the pan 12. A bolt 44 extends jointly through the parallel portion 28 and 29 of the base 10 and through the legs 41 and 42 of the bracket 38. This bolt serves as a pivot for pivotally supporting the spray 11 with respect to the base 10. A wing nut 45 screwed on the end of the bolt 44 serves to clamp the parts together and to hold the sprinkler in angularly adjusted position.

When the lawn sprinkler is to be used upon the lawn, the runners 34 of base 10 rest directly upon the grass and support the spray in any desired position. It will readily be comprehended that due to the curvature of said runners, indicated at 35 and 36, the entire lawn sprinkler may be moved about over the lawn by pulling or pushing the hose 23.

It frequently becomes desirable to support the sprinkler in an elevated position above the ground. For this purpose a post 46 is employed having a sharpened end 47 adapted to be driven into the ground. This post is of dimensions slightly less than the distance between the two parallel portions 28 and 29 of base 10. A socket 48 is provided for the upper end of the post 46 between the back 27 and the two parallel portions 28 and 29 of sides 25 and 26. This socket is partly formed by means of a plate 49 which fits in between the parallel portions 28 and 29 and which is soldered or welded thereto. The plate 49 has a flange 51 extending inwardly therefrom and which forms an end for the socket 48.

When the invention is to be supported in an elevated position, the post 46 is driven into the ground and the sprinkler applied to said post by causing the upper end of the said post to be received within the socket 48. The sprinkler is then properly mounted and the angularity of the spray 11 can be adjusted to cause the water leaving the same to be projected at any desired angle. Upon tightening the wing nut 45, the spray can be locked in adjusted position. It will be noted that the spray head may have considerable adjustment when mounted as shown in Fig. 3. While the degree of adjustment is less when the device is mounted as shown in Fig. 1, nevertheless sufficient adjustment is provided with this arrangement to give the desired results.

The advantages of my invention are manifest. The device is extremely simple and can be constructed at a nominal cost. With my invention the sprinkler can be moved about by sliding the same over the lawn on the runners provided so as to permit of moving the sprinkler without turning off the water. The sprinkler may be mounted either on the ground or at an elevated position and has sufficient adjustment in either position to give the desired degree of angularity. This may be quickly and easily accomplished by loosening the wing nut holding the parts in assembled position and by manually swinging the sprinkler about the clamping bolt as a pivot.

Changes in the specific form of my invention, as herein described, may be made within the scope of what is claimed without departing from the spirit of my invention.

Having described my invention, what I claim as new and desire to protect by Letters Patent is:

1. A supporting structure for a spray, said supporting structure including a base comprising a body having sides provided with spaced parallel portions for the reception of a part of the spray and outwardly extending flaring portion, runners formed on said flaring portions and pivot means between said spaced portions and the spray.

2. A supporting structure for a spray, said supporting structure including a base comprising a body having sides provided with spaced parallel portions and outwardly extending flaring portions, runners formed on said flaring portions, a back connecting said parallel portions together, said back falling short of said parallel portions at one end thereof to leave a slot therebetween for the reception of a part of the spray, and pivot means extending through said sides and part.

3. A supporting structure for a spray, said supporting structure including a base comprising a body having sides provided with spaced parallel portions and outwardly extending flaring portions, runners formed on said flaring portions, a back connecting said parallel portions together, said back falling short of said parallel portions at one end thereof, to leave a slot therebetween, a bracket U-shaped in form secured to the spray, said bracket having spaced legs, said bracket being disposed in said slot with the legs disposed adjacent the parallel portions of said sides and pivot means extending through said sides and legs.

4. A supporting structure for a spray, said supporting structure including a base comprising a body having sides provided with spaced parallel portions and outwardly extending flaring portions, runners formed on said flaring portions, a back connecting said parallel portions together, said back falling short of said parallel portions at one end thereof to leave a slot therebetween, a bracket U-shaped in form, secured to the spray, said bracket having spaced legs, said bracket being disposed in said slot with the legs disposed adjacent the parallel portions of said sides, pivot means extending through said sides and legs, and means forming with said back and sides an elongated socket having its axis parallel to said back.

5. A supporting structure for a spray, said supporting structure including a base comprising a body having sides provided with spaced parallel portions and outwardly extending flaring portions, runners formed on said flaring portions, a back connecting said parallel portions together, said back falling short of said parallel portions at one end thereof to leave a slot therebetween, a bracket U-shaped in form secured to the spray, said bracket having spaced legs, said bracket being disposed in said slot with the legs disposed adjacent the parallel portions of said sides, pivot means extending through said sides and legs, a plate disposed between said parallel portions and lying parallel with said back, said plate forming with said parallel portions and back a socket for the reception of the upper end of a post.

6. A supporting structure for a spray, said supporting structure including a base comprising a body having sides provided with spaced parallel portions and outwardly extending flaring portions, runners formed on said flaring portions, a back connecting said parallel portions together, said back falling short of said parallel portions at one end thereof to leave a slot therebetween, a bracket U-shaped in form secured to the spray, said bracket having spaced legs, said bracket being disposed in said slot with the legs disposed adjacent the parallel portions of said sides, pivot means extending through said sides and legs, a plate disposed between said parallel portions and lying parallel with said back, said plate forming with said parallel portions and back a socket for the reception of the upper end of a post, and a flange turned inwardly from said plate and forming an end wall for said socket.

ALBERT C. SCHLEH.

REFERENCES CITED

The following references are of record in the file of this patent:

UNITED STATES PATENTS

| Number | Name | Date |
|--------|------|------|
| 396,129 | Willits | Jan. 15, 1889 |